(12) United States Patent
Adachi et al.

(10) Patent No.: US 10,460,894 B2
(45) Date of Patent: Oct. 29, 2019

(54) GAS CIRCUIT BREAKER

(71) Applicant: MITSUBISHI ELECTRIC CORPORATION, Chiyoda-ku, Tokyo (JP)

(72) Inventors: Masataka Adachi, Tokyo (JP); Yasunori Nakamura, Tokyo (JP); Yuji Yoshitomo, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/069,401

(22) PCT Filed: Jan. 19, 2016

(86) PCT No.: PCT/JP2016/051425
§ 371 (c)(1),
(2) Date: Jul. 11, 2018

(87) PCT Pub. No.: WO2017/126029
PCT Pub. Date: Jul. 27, 2017

(65) Prior Publication Data
US 2019/0006135 A1    Jan. 3, 2019

(51) Int. Cl.
*H01H 33/56* (2006.01)
*H01H 33/70* (2006.01)
(Continued)

(52) U.S. Cl.
CPC ........ *H01H 33/7015* (2013.01); *H01H 33/56* (2013.01); *H01H 33/91* (2013.01);
(Continued)

(58) Field of Classification Search
CPC .... H01H 33/7015; H01H 33/56; H01H 33/91; H01H 33/561; H01H 33/64; H01H 2033/888; H02B 13/035; H02B 13/055
(Continued)

(56) References Cited

U.S. PATENT DOCUMENTS 4,139,753 A    2/1979  Cromer et al.
4,426,561 A *  1/1984  Berkebile ............ H01H 33/703
                                                          218/59
(Continued)

FOREIGN PATENT DOCUMENTS

DE    102011083593 A1    3/2013
JP    56-104031 U         8/1981
(Continued)

OTHER PUBLICATIONS

Extended European Search Report dated Dec. 10, 2018, issued by the European Patent Office in corresponding European Application No. 16886271.2. (11 pages).
(Continued)

*Primary Examiner* — Truc T Nguyen
*Assistant Examiner* — William A Bolton
(74) *Attorney, Agent, or Firm* — Buchanan Ingersoll & Rooney PC (57) ABSTRACT

A gas circuit breaker that includes: a first tank filled with an insulating gas; a fixed contact provided inside the first tank; a movable contact provided inside the first tank; a nozzle that ejects the insulating gas toward the fixed contact when the movable contact moves in a first direction; a cylindrical body that guides the gas ejected from the nozzle in a second direction; and a second tank connected to the first tank in the second direction. The movable contact is movable between a position in contact with the fixed contact and a position separated from the fixed contact. The first direction is a direction in which the movable contact moves from the position in contact with the fixed contact to the position separated from the fixed contact. The second direction is a direction opposite to the first direction.

16 Claims, 7 Drawing Sheets

(51) Int. Cl.
  *H01H 33/91* (2006.01)
  *H01H 33/88* (2006.01)
  *H02B 13/035* (2006.01)
  *H02B 13/055* (2006.01)
(52) U.S. Cl.
  CPC ......... *H02B 13/035* (2013.01); *H02B 13/055* (2013.01); *H01H 2033/888* (2013.01); *H01H 2239/06* (2013.01)
(58) Field of Classification Search
  USPC ... 218/49, 51, 53, 55, 56, 57, 59–61, 68, 87
  See application file for complete search history.

(56) References Cited

U.S. PATENT DOCUMENTS 4,565,911 A * 1/1986 Slamecka .............. H01H 33/91
                                                218/63
5,077,453 A * 12/1991 Hasegawa ............. H01H 33/56
                                                218/74
7,893,379 B2 * 2/2011 Schoenemann ........ H01H 33/74
                                                218/156
2005/0173378 A1 * 8/2005 Nowakowski ......... H01H 33/91
                                                218/43

FOREIGN PATENT DOCUMENTS

| JP | 64-10939 U | 1/1989 |
| JP | 04-047624 A | 2/1992 |
| JP | 4-56027 A | 2/1992 |
| JP | 09-129098 A | 5/1997 |
| JP | 2005-019273 A | 1/2005 |

OTHER PUBLICATIONS

International Search Report (PCT/ISA/210) dated Apr. 12, 2016, by the Japanese Patent Office as the International Searching Authority for International Application No. PCT/JP2016/051425.

* cited by examiner

GAS CIRCUIT BREAKER

FIELD

The present invention relates to a gas circuit breaker which cuts off an electric current in a tank filled with an insulating gas.

BACKGROUND

Conventionally, a gas circuit breaker including a movable contact and a fixed contact provided in a tank filled with an insulating gas has been used as disclosed in Patent Literature 1. In such a gas circuit breaker, as the movable contact comes into contact with the fixed contact, an electric current is supplied to a current supply target, and as the movable contact separates from the fixed contact, the electric current is cut off. The movable contact includes a nozzle that ejects the insulating gas in the tank toward the fixed contact when the movable contact separates from the fixed contact. The arc generated between the movable contact and the fixed contact is extinguished by the insulating gas ejected toward the fixed contact.

CITATION LIST

Patent Literature

Patent Literature 1: Japanese Patent Application Laid-open No. 2005-19273

SUMMARY

Technical Problem

The temperature of the insulating gas ejected from the nozzle rises due to the arc. Therefore, the gas circuit breaker may include a cooling cylinder for cooling the insulating gas ejected from the nozzle. The insulating gas passes through the cooling cylinder so as to be cooled down by radiation to the cooling cylinder.

The insulating gas that has passed through the cooling cylinder collides with a wall surface of the tank, and returns to the surroundings of the cooling cylinder. The insulating gas maintains a certain degree of temperature even after passing through the cooling cylinder, and the temperature of the insulating gas drops while the insulating gas returns to the surroundings of the cooling cylinder. However, if the temperature of the insulating gas is insufficiently dropped while the insulating gas returns to the surroundings of the cooling cylinder, the density of the insulating gas around the cooling cylinder decreases, which may cause a deterioration in insulating performance and cause a ground fault.

Therefore, it is conceivable that the distance from the cooling cylinder to the wall surface of the tank is lengthened so that the temperature of the insulating gas is sufficiently dropped before the insulating gas returns to the surroundings of the cooling cylinder after passing through the cooling cylinder. However, this causes an increase in the distance between the wall surface of the tank and each contact. The wall surface with which the cooling gas collides may be configured by a lid that blocks an opening for maintenance formed in the tank. In this case, as the distance between the wall surface of the tank and each contact increases, thus the workability of maintenance for replacing each contact deteriorates.

The present invention has been made in view of the above, and an object thereof is to obtain a gas circuit breaker capable of suppressing the occurrence of a ground fault and improving maintainability.

Solution to Problem

In order to solve the above-mentioned problems and to achieve the object, the present invention provides a gas circuit breaker including a first tank, a fixed contact, a movable contact, a nozzle, a cylindrical body, and a second tank. The first tank is filled with an insulating gas. The fixed contact is provided inside the first tank. The movable contact is provided inside the first tank and capable of reciprocating between a position in contact with the fixed contact and a position separated from the fixed contact. The nozzle ejects the insulating gas toward the fixed contact when the movable contact moves in a first direction, assuming that the first direction is a direction in which the movable contact moves from the position in contact with the fixed contact to the position separated from the fixed contact. The cylindrical body guides the gas ejected from the nozzle in a second direction, assuming that the second direction is a direction opposite to the first direction. The second tank is connected to the first tank in the second direction.

Advantageous Effects of Invention

The gas circuit breaker according to the present invention can achieve the effect of suppressing the occurrence of a ground fault and improving maintainability.

DESCRIPTION OF EMBODIMENTS

Hereinafter, a gas circuit breaker according to an embodiment of the present invention will be described in detail based on the drawings. The present invention is not limited to the embodiment.

Embodiment

Figure 1:
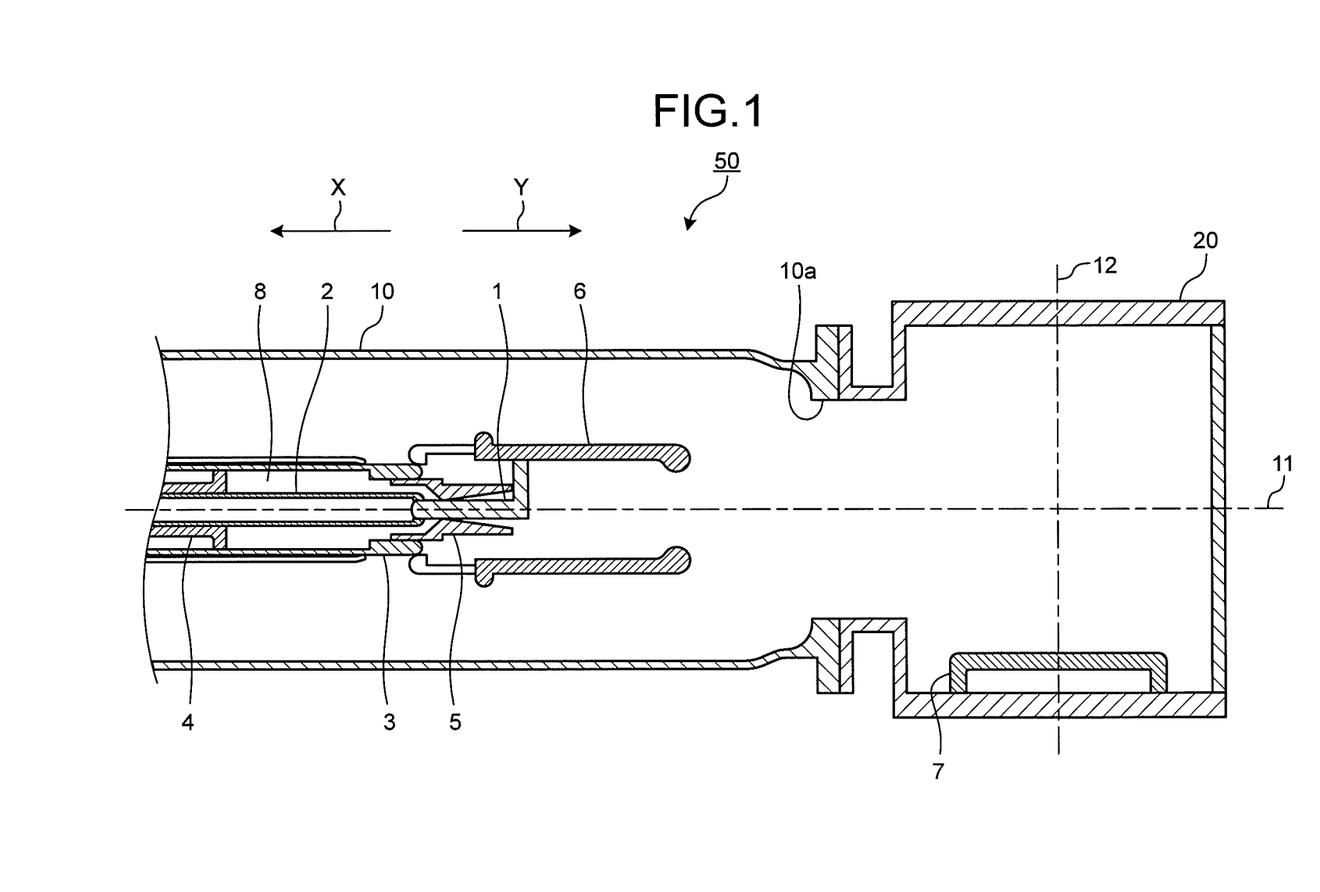
FIG. 1 is a longitudinal sectional view illustrating a gas circuit breaker according to an embodiment of the present invention, indicating that a fixed contact and a movable contact are in contact with each other.
Figure 2:
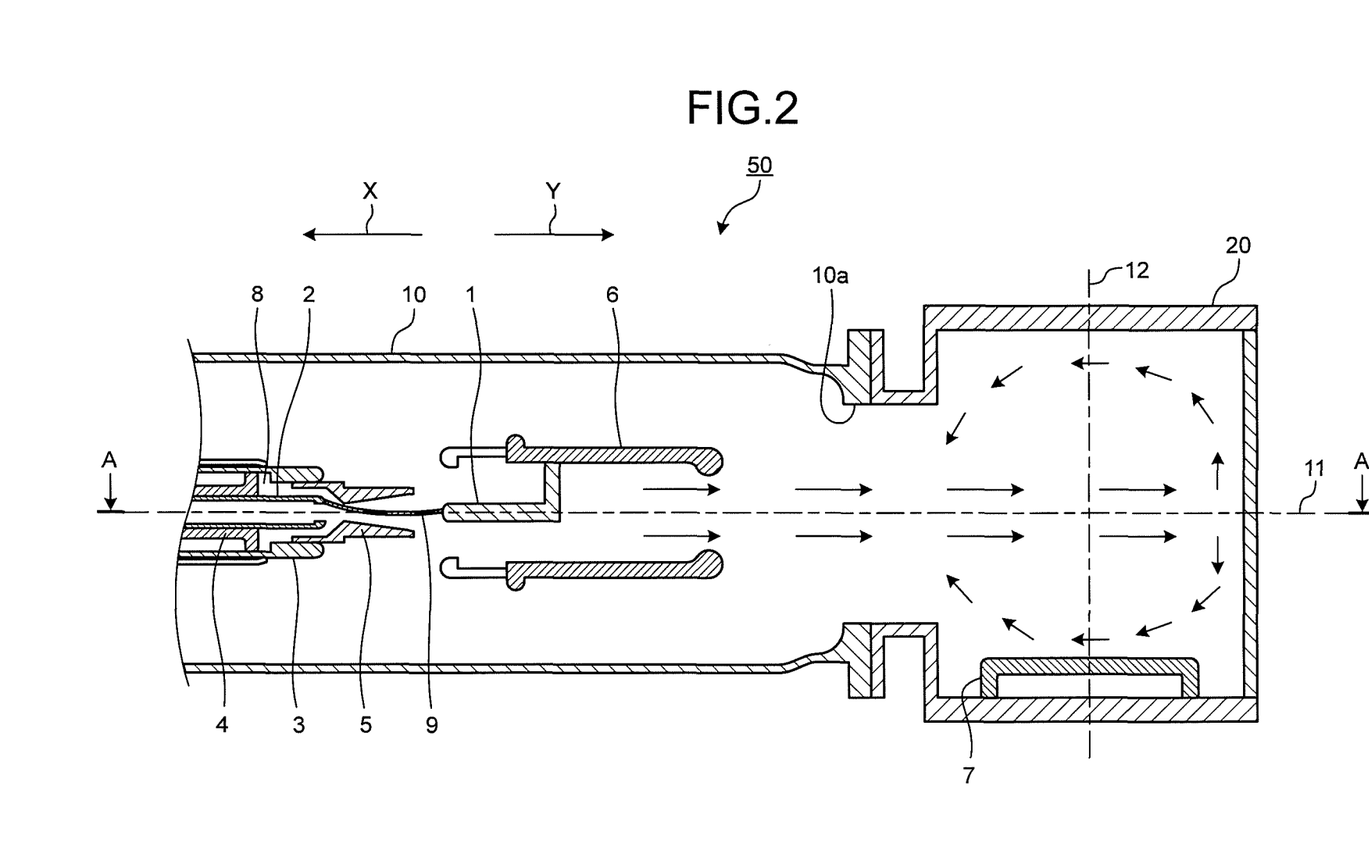
FIG. 2 is a longitudinal sectional view illustrating the gas circuit breaker according to the present embodiment, indicating that the fixed contact and the movable contact are separated from each other.
Figure 3:
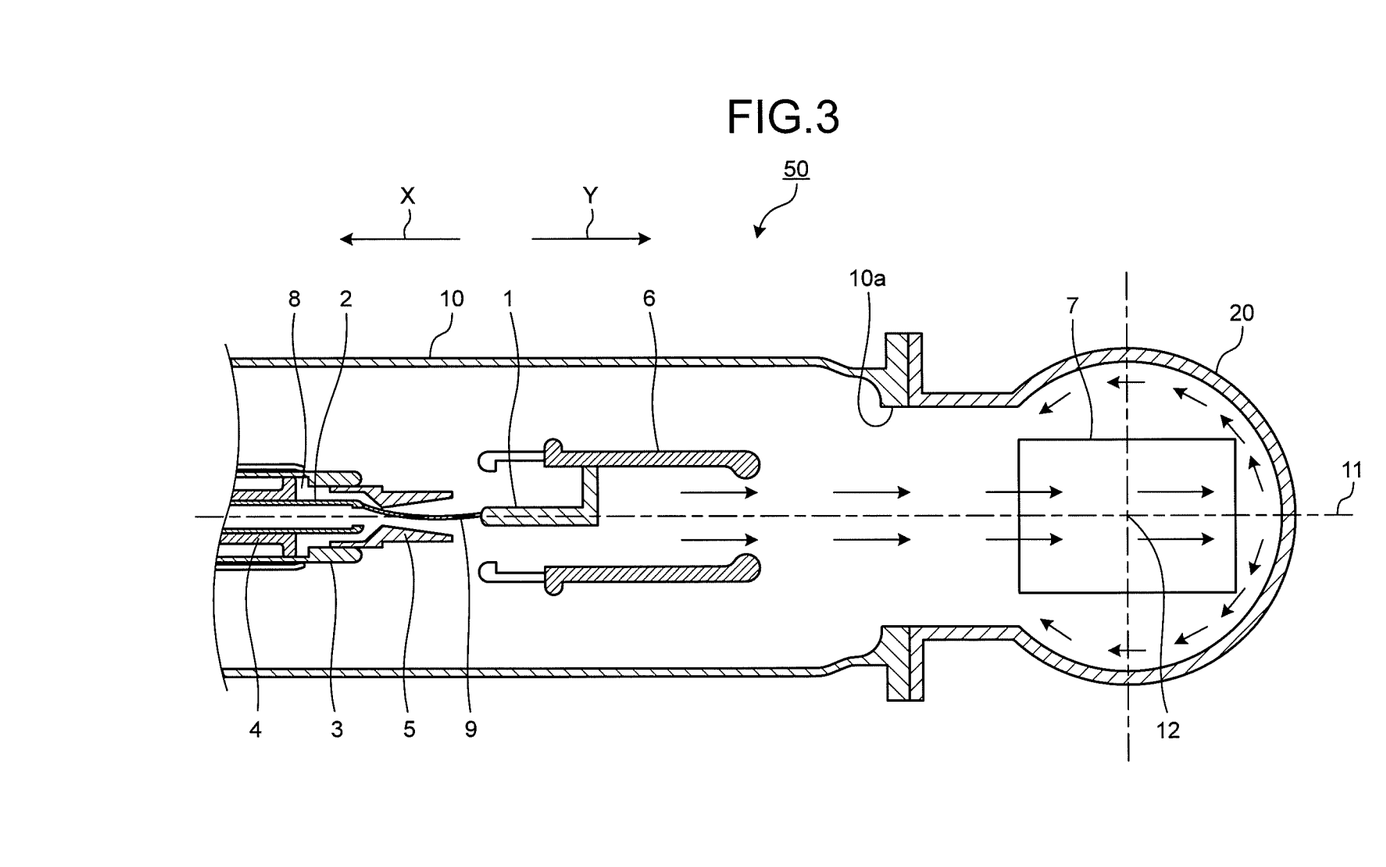
FIG. 3 is a cross sectional view illustrating the gas circuit breaker according to the present embodiment, taken along line A-A illustrated in FIG. 2.

FIG. 1 is a longitudinal sectional view illustrating a gas circuit breaker according to an embodiment of the present invention, indicating that a fixed contact and a movable contact are in contact with each other. FIG. 2 is a longitudinal sectional view illustrating the gas circuit breaker according to the present embodiment, indicating that the fixed contact and the movable contact are separated from each other. FIG. 3 is a cross sectional view illustrating the gas circuit breaker according to the present embodiment, taken along line A-A illustrated in FIG. 2. The gas circuit breaker 50 includes a main tank 10 which is a first tank, the fixed contact 1, the movable contact 2, a movable cylindrical body 3, a piston 4, a nozzle 5, a cooling cylinder 6 which is a cylindrical body, a terminal tank 20 which is a second tank, and a moisture absorbent container 7.

The main tank 10 has a cylindrical shape that extends centering on an axis 11. The main tank 10 is filled with an insulating gas. The insulating gas is, for example, $SF_6$. The main tank 10 includes an opening 10a formed on one end side along the axis 11.

The fixed contact 1 is provided coaxially with the axis 11 inside the main tank 10. The movable contact 2 is provided inside the main tank 10 and is movable along the axis 11. More specifically, the movable contact 2 is capable of reciprocating between a position in contact with the fixed contact 1 as illustrated in FIG. 1 and a position separated from the fixed contact 1 as illustrated in FIGS. 2 and 3. As the movable contact 2 comes into contact with the fixed contact 1, an electric current is supplied to a current supply target. Note that a link mechanism or the like for moving the movable contact 2 is not illustrated.

The movable contact 2 is provided at a position opposite to the opening 10a of the tank 10, with the fixed contact 1 interposed therebetween. Therefore, when the movable contact 2 moves in a direction of coming into contact with the fixed contact 1, the movable contact 2 moves in a direction toward the opening 10a, and when the movable contact 2 moves in a direction of separating from the fixed contact 1, the movable contact 2 moves in a direction away from the opening 10a. Note that a first direction, which is a direction in which the movable contact 2 moves to the position separated from the fixed contact 1, is illustrated as the direction indicated by arrow X. A second direction, which is a direction in which the movable contact 2 moves to the position in contact with the fixed contact 1, is illustrated as the direction indicated by arrow Y. The first direction (direction indicated by arrow X), the second direction (direction indicated by arrow Y), and the axis 11 are parallel.

The movable cylindrical body 3 has a tubular shape centering on the axis 11, and is provided so as to surround the movable contact 2 inside the main tank 10. The movable cylindrical body 3 moves in conjunction with the movable contact 2.

The piston 4 is provided inside the movable cylindrical body 3, and blocks the gap between the movable cylindrical body 3 and the movable contact 2. The piston 4 does not move in conjunction with the movable contact 2 and the movable cylindrical body 3, and is fixed in a position inside the main tank 10. As illustrated in FIG. 1, in a state where the movable contact 2 is in contact with the fixed contact 1, a space located inside the movable cylindrical body 3 and extending from the piston 4 in the direction indicated by arrow Y constitutes a puffer chamber 8. The nozzle 5 is provided at the end of the movable cylindrical body 3 in the direction indicated by arrow Y.

When the movable contact 2 moves from the position in contact with the fixed contact 1 as illustrated in FIG. 1 in the direction indicated by arrow X to separate from the fixed contact 1 as illustrated in FIGS. 2 and 3, the movable contact 2, the movable cylindrical body 3, and the nozzle 5 move in the direction indicated by arrow X, whereas the piston 4 does not move. Therefore, the capacity of the puffer chamber 8 is reduced, and the insulating gas in the puffer chamber 8 is ejected from the nozzle 5 toward the fixed contact 1.

An arc may be generated between the movable contact 2 and the fixed contact 1 when the movable contact 2 separates from the fixed contact 1. The arc 9 generated between the movable contact 2 and the fixed contact 1 is extinguished by the insulating gas ejected from the nozzle 5. At this time, the temperature of the insulating gas ejected from the nozzle 5 rises due to the heat generated by the arc 9.

The cooling cylinder 6 is provided in the direction indicated by arrow Y with respect to the fixed contact 1, and has a tubular shape centering on the axis 11. The insulating gas ejected from the nozzle 5 is guided in the direction indicated by arrow Y by passing through the cooling cylinder 6. As a result, the insulating gas ejected from the nozzle 5 flows toward the opening 10a of the main tank 10. In addition, the insulating gas whose temperature has been risen by the arc 9 is cooled down by radiation to the cooling cylinder 6 while the insulating gas passes through the cooling cylinder 6.

The terminal tank 20 is a tank connected to the opening 10a of the main tank 10. The terminal tank 20 is communicated with inside the main tank 10 through the opening 10a. In other words, it can be said that the space of the main tank 10 filled with the insulating gas is extended by the terminal tank 20 in the direction indicated by arrow Y. The insulating gas ejected from the nozzle 5 flows through the opening 10a of the main tank 10 to inside the terminal tank 20 along the direction indicated by arrow Y.

As illustrated in FIGS. 2 and 3, the terminal tank 20 has a cylindrical shape centering on an axis 12 that is orthogonal to the axis 11. The space inside the terminal tank 20 has a cross sectional area larger than the area of the opening 10a when viewed along the axis 11. In other words, it can be said that a stepped shape that narrows the internal space is formed in the course leading from the cylindrical portion of the terminal tank 20 to the opening 10a of the main tank 10.

The moisture absorbent container 7 is provided inside the terminal tank 20 at a position other than a region facing the opening 10a of the main tank 10. In the present embodiment, the moisture absorbent container 7 is provided on a flat inner surface of the terminal tank 20 having a circular shape when viewed along the axis 12. The moisture absorbent container 7 is a case for storing a moisture absorbent. Moisture contained in the insulating gas is absorbed by the moisture absorbent stored in the moisture absorbent container 7, preventing deterioration of insulation performance of the insulating gas due to an increase in humidity inside the main tank 10 and the terminal tank 20.

According to the gas circuit breaker 50 described above, when the movable contact 2 separates from the fixed contact 1, the insulating gas ejected from the nozzle 5 flows into the terminal tank 20 through the opening 10a. The insulating gas that has flowed into the terminal tank 20 then collides with the inner wall surface of the terminal tank 20 intersecting the axis 11, as indicated by unmarked arrows in FIGS. 2 and 3.

The insulating gas that has collided with the inner wall surface of the terminal tank 20 intersecting the axis 11 is then diffused to the surroundings and the insulating gas changes its flow directions toward the main tank 10.

In the gas circuit breaker 50, a stepped shape that narrows the internal space is formed in the course leading from the cylindrical portion of the terminal tank 20 to the opening 10a of the main tank 10. Therefore, the direction of the insulating gas flowing in the terminal tank 20 toward the main tank 10 is changed at the stepped portion. The insulating gas that has flowed into the terminal tank 20 therefore circulates inside the terminal tank 20. Thus, as compared with a case where the terminal tank 20 is not provided, the insulating gas becomes hard to return to the surroundings of the cooling cylinder 6. Consequently, it is possible to prevent the high-temperature insulating gas from returning to the surroundings of the cooling cylinder 6 to decrease the density of the insulating gas around the cooling cylinder 6 and deteriorate insulation performance. That is, it is possible to suppress the occurrence of a ground fault between the main tank 10 and the cooling cylinder 6 due to a decrease in the density of the insulating gas around the cooling cylinder 6.

In addition, as compared with a case where the terminal tank 20 is not provided, it is possible to lengthen the distance that the insulating gas travels to return to the surroundings of the cooling cylinder 6 after passing through the cooling cylinder 6. Therefore, even when a part of the insulating gas returns to the surroundings of the cooling cylinder 6 without circulating inside the terminal tank 20, the range of decrease in the temperature of the insulating gas in this process is larger as compared with a case where the terminal tank 20 is not provided. Therefore, it is possible to more reliably prevent the high-temperature insulating gas from returning to the surroundings of the cooling cylinder 6 to decrease the density of the insulating gas and cause a ground fault.

The fixed contact 1 and the movable contact 2 can be accessed through the opening 10a by removing the terminal tank 20. As compared with a case where a space including the main tank 10 and the terminal tank 20 is secured only by the main tank 10, that is, a case where the main tank 10 is simply extended in the direction indicated by arrow Y, the position of the opening 10a can be closer to the fixed contact 1 and the movable contact 2 in the present embodiment. Therefore, it is possible to improve workability of maintenance of the fixed contact 1 and the movable contact 2 through the opening 10a.

Since the moisture absorbent container 7 is provided in a region other than the region facing the opening 10a, the moisture absorbent container 7 is prevented from being deformed by the pressure of the insulating gas flowing along the direction indicated by arrow Y. It is also conceivable to provide an opening for maintenance in the terminal tank 20 and to replace the moisture absorbent container 7 using the opening. In this case, in the present embodiment, by changing the angle of the terminal tank 20 centering on the axis 11, the positions of the moisture absorbent container 7 and the opening can be changed. Therefore, the positions of the moisture absorbent container 7 and the opening can be easily set to positions with excellent maintainability according to the installation environment of the gas circuit breaker 50.

Figure 4:
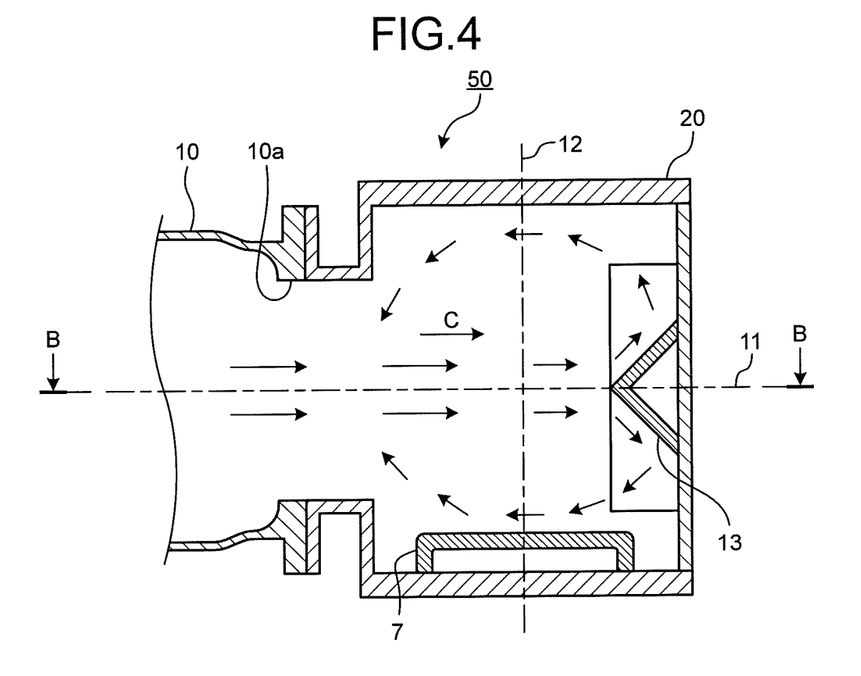
FIG. 4 is a longitudinal sectional view illustrating a terminal tank of the gas circuit breaker according to a first modification of the present embodiment.
Figure 5:
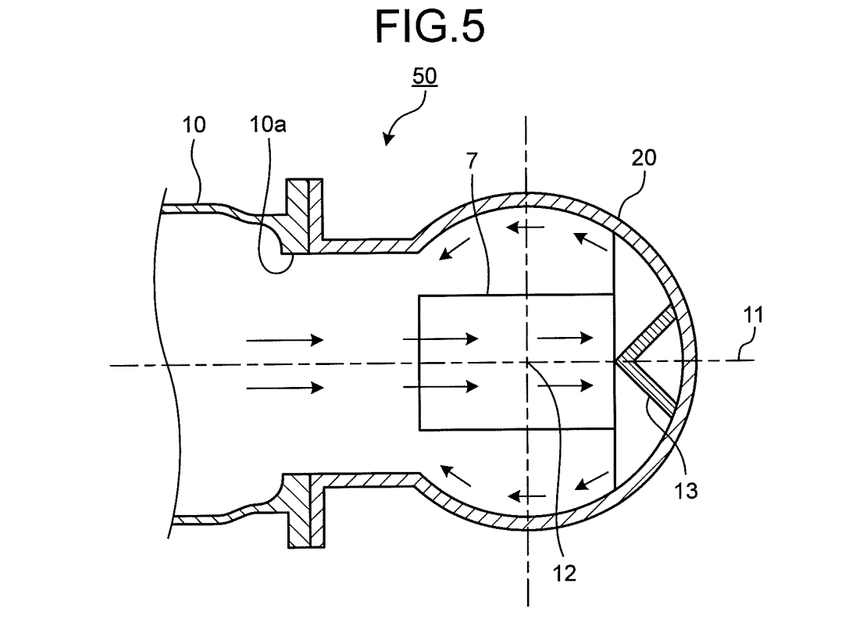
FIG. 5 is a cross sectional view illustrating the gas circuit breaker according to the first modification of the present embodiment, taken along line B-B illustrated in FIG. 4.

FIG. 4 is a longitudinal sectional view illustrating the terminal tank 20 of the gas circuit breaker 50 according to a first modification of the present embodiment. FIG. 5 is a cross sectional view illustrating the gas circuit breaker 50 according to the first modification of the present embodiment, taken along line B-B illustrated in FIG. 4.

Figure 6:
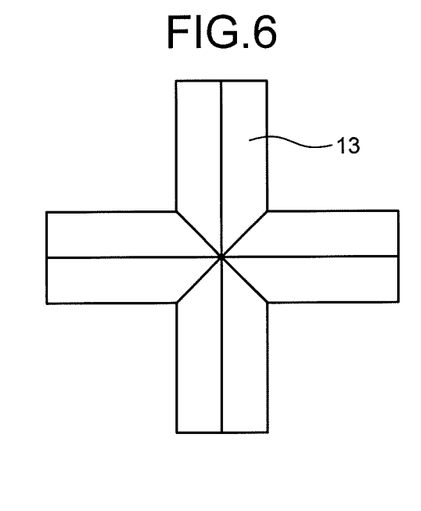
FIG. 6 is a view illustrating a diffusion promoter as seen along arrow C illustrated in FIG. 4.

In the gas circuit breaker 50 according to the first modification, a diffusion promoter 13 that promotes diffusion of the insulating gas is provided in an inner surface region of the terminal tank 20 facing the opening 10a of the main tank 10. FIG. 6 is a view illustrating the diffusion promoter 13 as seen along arrow C illustrated in FIG. 4.

The diffusion promoter 13 has such a shape that two members having L-shaped cross sections cross each other. Since the corners of the L-shaped cross sections are arranged to face the main tank 10, the insulating gas that has collided with the diffusion promoter 13 smoothly moves in different directions, and diffusion to the surroundings is promoted. As a result, the flow of the insulating gas inside the terminal tank 20 is stabilized, and the insulating gas easily circulates inside the terminal tank 20. Consequently, it is possible to suppress the insulating gas from returning to the cooling cylinder 6, and to suppress the occurrence of a ground fault.

Figure 7:
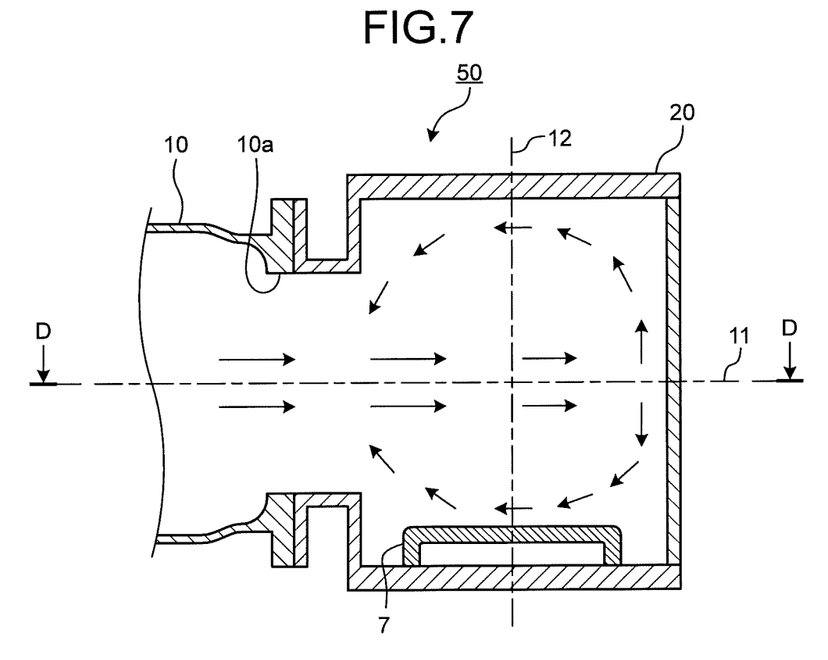
FIG. 7 is a longitudinal sectional view illustrating the terminal tank of the gas circuit breaker according to a second modification of the present embodiment.
Figure 8:
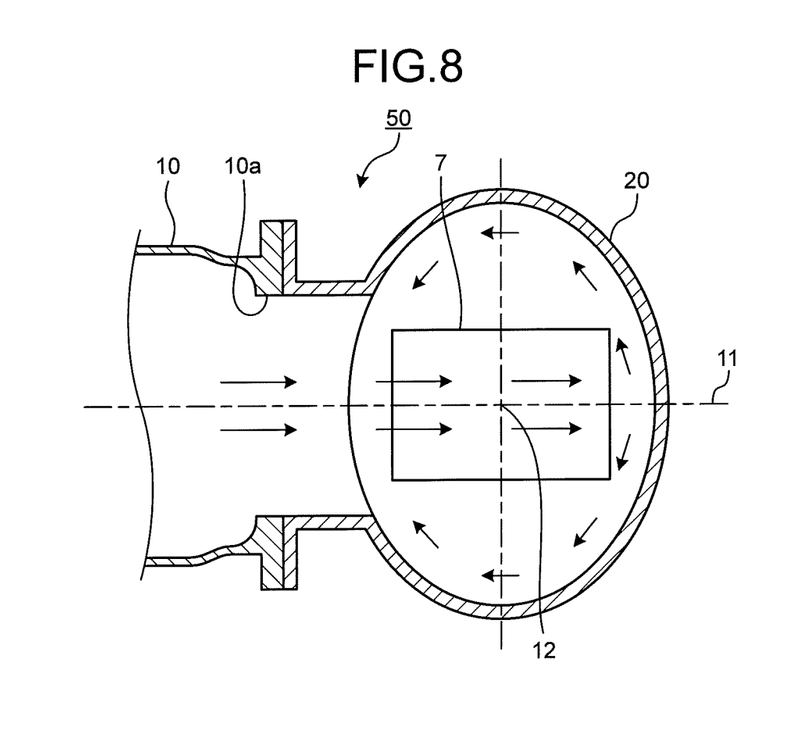
FIG. 8 is a cross sectional view illustrating the gas circuit breaker according to the second modification of the present embodiment, taken along line D-D illustrated in FIG. 7.

FIG. 7 is a longitudinal sectional view illustrating the terminal tank 20 of the gas circuit breaker 50 according to a second modification of the present embodiment. FIG. 8 is a cross sectional view illustrating the gas circuit breaker 50 according to the second modification of the present embodiment, taken along line D-D illustrated in FIG. 7.

In the gas circuit breaker 50 according to the second modification, the terminal tank 20 has a tubular shape having an elliptical cross section and including the axis 12 orthogonal to the axis 11 as the central axis. In this manner, even when the terminal tank 20 has a tubular shape having an elliptical cross section, a stepped shape can be provided between the main tank 10 and the terminal tank 20, and the stepped shape enables the insulating gas to circulate inside the terminal tank 20 to suppress the occurrence of a ground fault.

As in the case of the cylindrical terminal tank 20 illustrated in FIGS. 1 to 6, it is possible to lower the temperature of the insulating gas returning to the surroundings of the cooling cylinder 6 and to improve maintainability.

As illustrated in FIG. 7, the minor axis of the ellipse is parallel to the axis 11, that is, parallel to the direction indicated by arrow X, so that the length along the direction indicated by arrow X can be shorter than the length of the cylindrical terminal tank 20 illustrated in FIGS. 1 to 6. Even in this case, by adjusting the length of the major axis of the ellipse, the internal capacity of the terminal tank 20 can be sufficiently secured to make it difficult for the insulating gas to return to the surroundings of the cooling cylinder 6. As a result, the length of the gas circuit breaker 50 along the direction indicated by arrow X can be shortened. Note that the direction of the minor axis of the ellipse is not necessarily parallel to the direction indicated by arrow X.

As in the above first modification, a diffusion promoter may be provided in an inner surface region of the terminal tank 20 facing the opening 10a.

Figure 9:
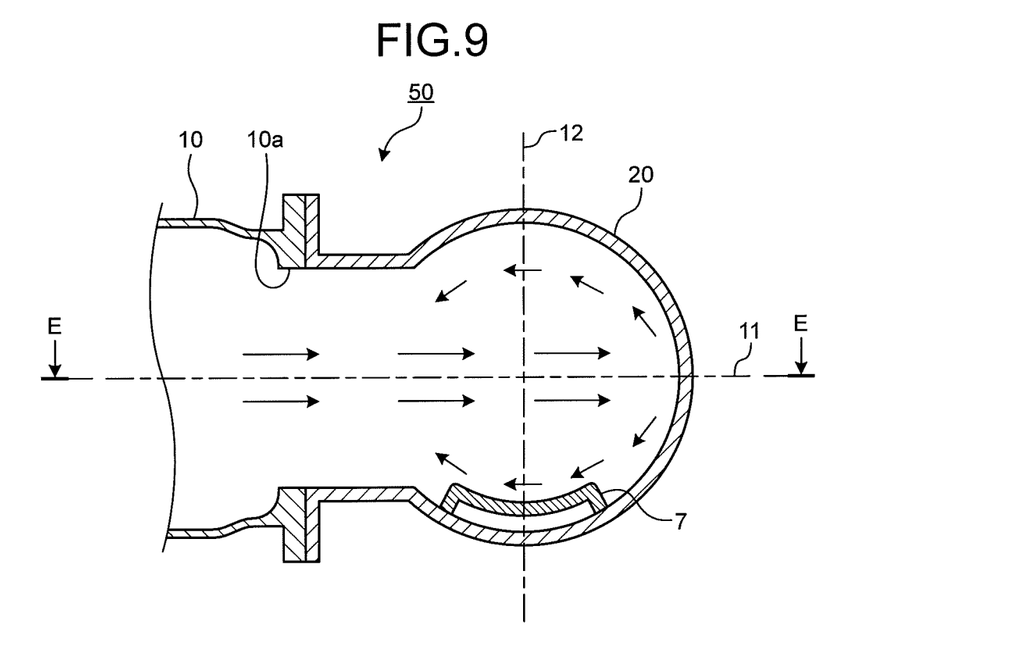
FIG. 9 is a longitudinal sectional view illustrating the terminal tank of the gas circuit breaker according to a third modification of the present embodiment.
Figure 10:
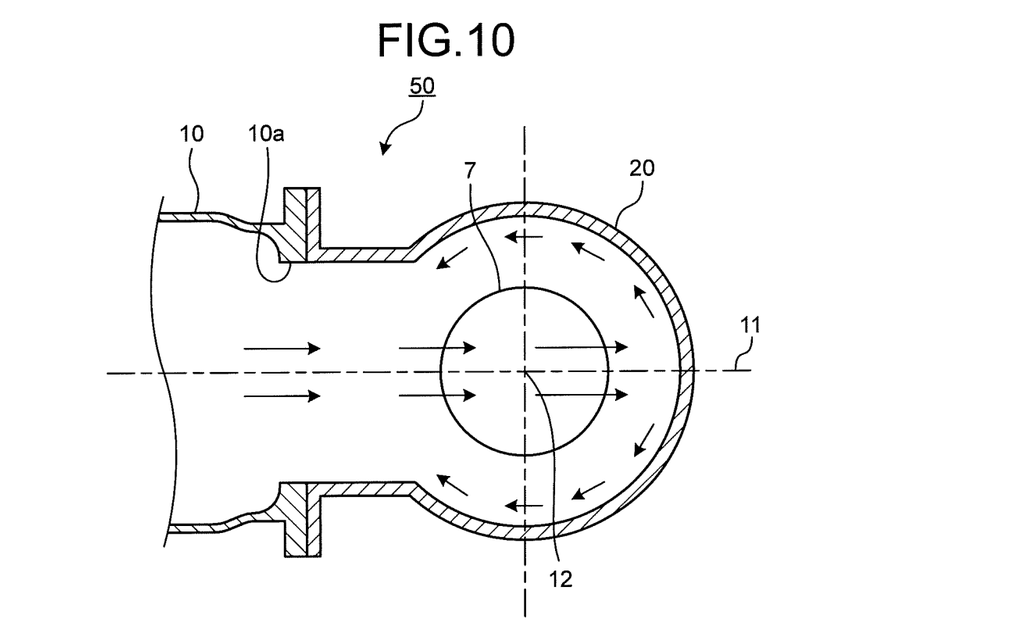
FIG. 10 is a cross sectional view illustrating the gas circuit breaker according to the third modification of the present embodiment, taken along line E-E illustrated in FIG. 9.

FIG. 9 is a longitudinal sectional view illustrating the terminal tank 20 of the gas circuit breaker 50 according to a third modification of the present embodiment. FIG. 10 is a cross sectional view illustrating the gas circuit breaker 50 according to the third modification of the present embodiment, taken along line E-E illustrated in FIG. 9.

In the gas circuit breaker 50 according to the third modification, the terminal tank 20 has a spherical shape. In this manner, even when the terminal tank 20 has a spherical shape, a step can be provided between the main tank 10 and the terminal tank 20, and the step enables the insulating gas to circulate inside the terminal tank 20 to suppress the occurrence of a ground fault.

As in the case of the cylindrical terminal tank 20 illustrated in FIGS. 1 to 6, it is possible to lower the temperature of the insulating gas returning to the surroundings of the cooling cylinder 6 and to improve maintainability.

As in the above first modification, a diffusion promoter may be provided in an inner surface region of the terminal tank 20 facing the opening 10a.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST 1 fixed contact; 2 movable contact; 3 movable cylindrical body; 4 piston; 5 nozzle; 6 cooling cylinder (cylindrical body); 7 moisture absorbent container; 8 puffer chamber; 9 arc; 10 main tank (first tank); 10a opening; 11, 12 axis; 13 diffusion promoter; 20 terminal tank (second tank); 50 gas circuit breaker.

The invention claimed is:

1. A gas circuit breaker comprising:
a first tank filled with an insulating gas;
a fixed contact provided inside the first tank;
a movable contact provided inside the first tank and movable between a position in contact with the fixed contact and a position separated from the fixed contact;
a nozzle that ejects the insulating gas toward the fixed contact when the movable contact moves in a first direction, the first direction being a direction in which the movable contact moves from the position in contact with the fixed contact to the position separated from the fixed contact;
a cylindrical body, provided inside the first tank, that guides the gas ejected from the nozzle in a second direction, the second direction being a direction opposite to the first direction; and
a second tank connected to the first tank in the second direction, wherein
the second tank has a cylindrical shape centering on an axis extending in a direction perpendicular to the first direction as a central axis,
the first tank includes an opening formed on one end side thereof along an axis extending in the first direction, said opening being separated from the cylindrical body, and
the insulating gas elected from the nozzle is elected in the first tank and flows into the second tank via the opening.

2. The gas circuit breaker according to claim 1, wherein when viewed along the first direction, a cross sectional area of an internal space of the second tank is larger than an area of an opening of the first tank at which the first tank is connected to the second tank.

3. The gas circuit breaker according to claim 1, further comprising
a diffusion promoter provided in an inner surface region of the second tank facing an opening of the first tank at which the first tank is connected to the second tank, the diffusion promoter being configured to diffuse the insulating gas to surroundings when the insulating gas ejected from the nozzle collides with the diffusion promoter.

4. The gas circuit breaker according to claim 1, further comprising
a moisture absorbent container provided on an inner surface of the second tank other than in a region facing an opening of the first tank at which the first tank is connected to the second tank, the moisture absorbent container storing a moisture absorbent therein.

5. A gas circuit breaker comprising:
a first tank filled with an insulating gas;
a fixed contact provided inside the first tank;
a movable contact provided inside the first tank and movable between a position in contact with the fixed contact and a position separated from the fixed contact;
a nozzle that ejects the insulating gas toward the fixed contact when the movable contact moves in a first direction, the first direction being a direction in which the movable contact moves from the position in contact with the fixed contact to the position separated from the fixed contact;
a cylindrical body that guides the gas ejected from the nozzle in a second direction, the second direction being a direction opposite to the first direction; and
a second tank connected to the first tank in the second direction, wherein
the second tank has a cylindrical shape centering on an axis extending in a direction perpendicular to the first direction as a central axis, and a cross section of the second tank has an elliptical shape.

6. The gas circuit breaker according to claim 5, wherein a minor axis of the elliptical shape of the second tank is parallel to the first direction.

7. The gas circuit breaker according to claim 6, wherein when viewed along the first direction, a cross sectional area of an internal space of the second tank is larger than an area of an opening of the first tank at which the first tank is connected to the second tank.

8. The gas circuit breaker according to claim 6, further comprising
a diffusion promoter provided in an inner surface region of the second tank facing an opening of the first tank at which the first tank is connected to the second tank, the diffusion promoter being configured to diffuse the insulating gas to surroundings when the insulating gas ejected from the nozzle collides with the diffusion promoter.

9. The gas circuit breaker according to claim 6, further comprising
a moisture absorbent container provided on an inner surface of the second tank other than in a region facing an opening of the first tank at which the first tank is connected to the second tank, the moisture absorbent container storing a moisture absorbent therein.

10. The gas circuit breaker according to claim 5, wherein when viewed along the first direction, a cross sectional area of an internal space of the second tank is larger than an area of an opening of the first tank at which the first tank is connected to the second tank.

11. The gas circuit breaker according to claim 5, further comprising
a diffusion promoter provided in an inner surface region of the second tank facing an opening of the first tank at which the first tank is connected to the second tank, the diffusion promoter being configured to diffuse the insulating gas to surroundings when the insulating gas ejected from the nozzle collides with the diffusion promoter.

12. The gas circuit breaker according to claim 5, further comprising
- a moisture absorbent container provided on an inner surface of the second tank other than in a region facing an opening of the first tank at which the first tank is connected to the second tank, the moisture absorbent container storing a moisture absorbent therein.

13. A gas circuit breaker comprising:
- a first tank filled with an insulating gas;
- a fixed contact provided inside the first tank;
- a movable contact provided inside the first tank and movable between a position in contact with the fixed contact and a position separated from the fixed contact;
- a nozzle that ejects the insulating gas toward the fixed contact when the movable contact moves in a first direction, the first direction being a direction in which the movable contact moves from the position in contact with the fixed contact to the position separated from the fixed contact;
- a cylindrical body that guides the gas ejected from the nozzle in a second direction, the second direction being a direction opposite to the first direction; and
- a second tank connected to the first tank in the second direction, wherein
the second tank has a spherical shape.

14. The gas circuit breaker according to claim 13, wherein when viewed along the first direction, a cross sectional area of an internal space of the second tank is larger than an area of an opening of the first tank at which the first tank is connected to the second tank.

15. The gas circuit breaker according to claim 13, further comprising
- a diffusion promoter provided in an inner surface region of the second tank facing an opening of the first tank at which the first tank is connected to the second tank, the diffusion promoter being configured to diffuse the insulating gas to surroundings when the insulating gas ejected from the nozzle collides with the diffusion promoter.

16. The gas circuit breaker according to claim 13, further comprising
- a moisture absorbent container provided on an inner surface of the second tank other than in a region facing an opening of the first tank at which the first tank is connected to the second tank, the moisture absorbent container storing a moisture absorbent therein.

* * * * *